Aug. 29, 1939.    C. F. TEARS    2,171,377
CONTACT FILTRATION OF VISCOUS LUBRICATING OILS FOR DECOLORIZATION
Filed May 25, 1934
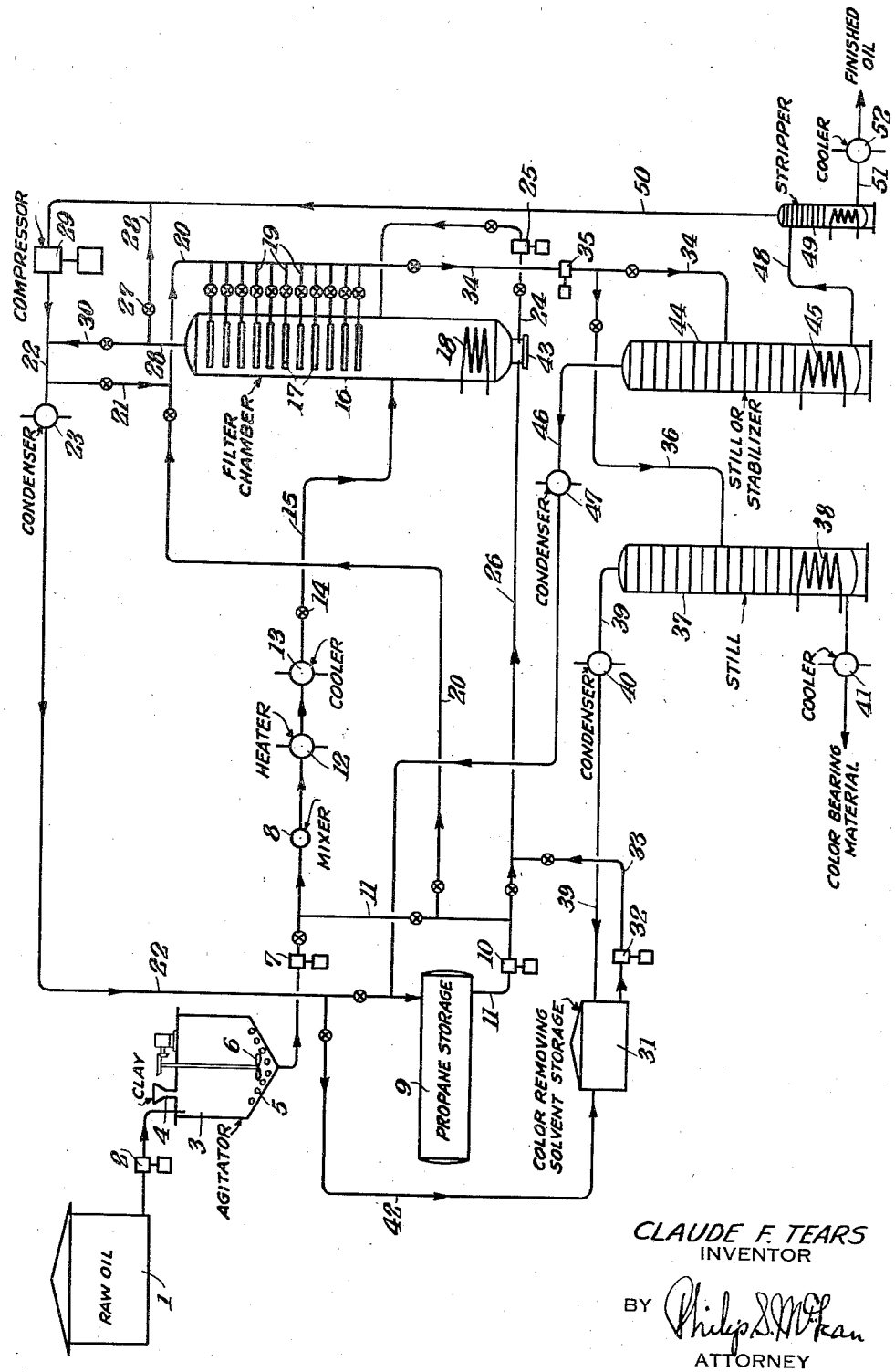
CLAUDE F. TEARS
INVENTOR
BY 
ATTORNEY Patented Aug. 29, 1939

2,171,377

UNITED STATES PATENT OFFICE 2,171,377

CONTACT FILTRATION OF VISCOUS LUBRICATING OILS FOR DECOLORIZATION

Claude F. Tears, Mountain Lakes, N. J., assignor to The Petroleum Processes Corporation, Wichita, Kans., a corporation of Kansas Application May 25, 1934, Serial No. 727,497

8 Claims. (Cl. 196—147)

The present invention is a continuation-in-part of the Tears application Ser. No. 679,073 which has issued as Patent No. 2,067,802, January 12, 1937 and relates to the decolorization of viscous lubricating oils, particularly the contact filtration of viscous lubricating oils in solutions of propane or other liquefied normally gaseous hydrocarbon under pressure sufficient to hold the solvent in the liquid state.

The general objects of this invention are to reduce installation and operating costs, solvent and oil losses, to increase the throughput per unit of filter area and to raise the production of finished oil per unit of clay, thereby reducing the cost of clay consumption.

The usual methods of contact filtration of lubricating oils involve heating and mixing of fine clay and oil to high temperatures and filtering out the clay in plate filter presses. In handling high viscosity oils, it is necessary to decrease the viscosity, so as to increase the activity or effect of the clay and thus increase the rate of filtration per unit of filter area. This viscosity reduction has been accomplished by heating the oil to temperatures in the range of 450° F. to 650° F., or by putting the oil into solution in warm naphtha and filtering the solution, the filter cake finally being washed with clean naphtha to recover the oil content and the naphtha removed from the clay usually by blowing with a stream of warm air.

The naphtha used in such prior operations is not a particularly good solvent and its boiling range is relatively high. As a consequence, the oil in the filter cake was never completely removed and the naphtha employed for washing the cake was never completely recovered by air blowing. There have thus been costly losses of both oil and solvent.

The use of propane or other like normally gaseous liquid hydrocarbons as a solvent for the oil in accordance with this invention results in certain definite and marked advantages over the prior methods outlined.

In the first place, because of the extremely low viscosity of propane, the viscosity of the oil solution is much lower than a naphtha solution could be. This means increased activity of the clay and hence increased yield of oil per ton of clay and with actual reduction of clay consumption. The low viscosity of the solution also means reduced pressure drop through a filter cake, thus increasing the throughput per unit of filter area.

Propane is an excellent oil solvent at relatively low temperatures, so is particularly effective for washing oil from the decolorizing clay. This means that oil losses with exhausted clay can be practically eliminated and there are no oxidation losses.

The extreme volatility of propane or the like, makes it possible to completely remove the solvent by use of heat at low temperatures or simply by reduction of pressure on the system and this also is a factor in elimination of solvent losses with exhausted clay. The ability to strip this solvent from the oil at low temperatures also avoids deleterious effects of high temperature stripping on finished oil.

Other objects, advantages and features of the invention are set forth or will appear in the following specification, particularly by reference to the accompanying drawing.

The drawing forming in effect part of the specification illustrates one practical commercial embodiment of the invention, but as the same is primarily for purposes of disclosure, it should be understood that structure and steps may be modified to suit particular requirements and circumstances, all within the true intent and broad scope of the invention.

The single view in the drawing is a flow sheet diagram illustrating operation of the invention.

As shown, the oil to be treated is taken from tank 1, and charged by pump 2, to an agitator 3, into which fine contact decolorizing clay is introduced at 4.

This oil-clay mixture is warmed as by means of a heating coil 5, in the bottom of the agitator and agitation effected by a motor driven agitating device 6.

From the agitator, the oil-clay mixture is passed by pump 7, to a mixer 8. Propane or like liquefied normally gaseous diluent is also delivered to this mixer from pressure storage tank 9, by pump 10, through line 11.

To insure complete solution of the oil in the propane, the mixture of oil, propane and clay is then brought up to a temperature usually between 125° F. and 175° F. in heater 12, after which it is cooled in cooler 13.

The heating and cooling operations are conducted under pressure sufficient to maintain the solvent in the liquid state at the heating temperature employed, by regulation of back pressure valve 14, in the charge line 15, leading to the filter.

The filter consists of a shell 16, constructed for pressure operation and equipped with filter elements 17, in the top section and a heating coil 18, in the bottom of the same.

The oil-clay-propane mixture fills the pressure shell and the oil solution passes out through the valved filtrate lines 19, leaving the clay retained on the filter elements. As the filter chamber and other parts of the apparatus are constructed for pressure operation, high filtration pressures may be maintained as required.

The clay filtered from the oil solution builds up filter cake on the filter elements with a portion of it dropping to the bottom of the filter chamber. That part which remains on the filter units may be removed by back washing these units with liquid propane through the line 11—20, connected with selective draw-offs 19, or with propane gas through line 21, cut into the line 20, and connected in the return to storage line 22, ahead of the liquefying condenser 23.

The clay dropping to the bottom of the filter chamber may be kept in suspension in the oil-propane solution by circulation from the bottom back to the middle of the filter chamber by means of a line 24, having a pump 25 therein. Thus the greatest decolorizing effect may be gotten out of all the clay.

The operation is continuous and it is contemplated that a plurality of filter chambers be provided with facilities for switching to a clean filter chamber when the lower section of a preceding filter chamber has become more or less filled with the separated clay.

In the diagram, only one filter chamber is illustrated and when this has become filled in the lower portion with separated clay, the charge is shut off or switched to a clean filter and the exhausted clay is then washed with clean liquid propane from pump 10, through line 26. This line is entered in the bottom of the filter chamber causing the wash solvent to pass up through the clay and out through the filter elements, thus removing the recoverable oil retained by the clay.

After washing the clay of the recoverable oil as described, the filter chamber may be vented by means of valve 27, in the line 28, extending to the suction side of the compressor 29, which latter compresses the gaseous propane to the condensing pressure at the cooling temperature of the condenser 23. The vented propane thus condensed to liquid form is returned to the pressure storage tank 9, through line 22.

The clay may be completely dried by application of heat through use of heating coil 18, in the bottom of the filter chamber and through which hot oil or other convenient heating medium may be circulated.

As an alternative step, the major portion of the propane may be exhausted from the clay by reduced pressure distillation through line 28—30, direct to the condenser 23, the heat required being supplied by heating coil 18. After distilling off most of the propane in this way, the filter chamber may be vented to the compressor suction for complete removal of propane and the drying of the clay.

After drying, the clay may be cleaned and reactivated by washing it with a color removing solvent, such as trichlorethylene stored in tank 31, and delivered to the bottom of the filter chamber by pump 32, through line 33—26. This color removing solvent passes out through the filter elements into the filtrate line 34, and is transferred by pump 35, through a branch line 36, to a recovery system including a distillation unit 37. The type of unit employed will depend upon the solvent used. For trichlorethylene a low pressure distillation system is employed. In this unit, the color removing solvent is distilled overhead from the color containing residue as by application of heat through a heating coil 38, in the bottom of the still. The vapor passing out overhead through line 39, is condensed by condenser 40, and returned in the liquid phase to the color removing solvent storage tank 31, and the color bearing residue is removed from the bottom of the still through a cooler 41.

The color removing solvent remaining in the chamber after the washing described may be removed from the clay in the same manner as first described for removal of propane, that is, by venting through line 30, and the use of heat at 18, and suction through line 28, condensing at 23, and returning in liquid phase through line 22—42 to storage at 31.

The reactivated clay after being dried can be removed from the filter chamber through the clay discharge connection 43, at the bottom of the chamber and be returned to the agitator for reuse.

The filtered oil taken off by the line 34 is charged by pump 35, to a pressure distillation still or stabilizer 44, where the propane is driven off from the oil by application of heat through heating coil 45, or the like. The vaporized propane passing off overhead through line 46, is condensed in the condenser 47, and returns through this line to the pressure storage tank 9. The liquid propane used for washing oil from the clay is also recovered in this same system and by similar procedure.

The decolorized filtered oil with the major portion of the propane removed flows from the bottom of the stabilizer through line 48, to a low pressure stripper 49, where the last traces of propane are removed through the vapor line 50, connected with the suction side of the compressor. The finished oil passes off from the bottom of the stripper through line 51 and cooler 52, to storage.

While usually the decolorizing clay may be first mixed with the oil, in some instances, the clay may enter the system with the propane or be mixed with the oil-propane solution.

The structure of the filter may vary. Simple fabric filter leaves or edge type elements as in the Hele-Shaw or Cuno filter units may be used in a pressure filter chamber as described. Also a continuous rotary type filter equipped with cake washing facilities and automatic mechanical cake removal map be employed. A simple pressure plate filter of the closed type similar to those used in conventional contact filtration also may be employed.

With pressure filter chamber operation as described, it is possible to operate the filter chamber at a pressure sufficiently high to effect delivery of the filtrate direct to the pressure stabilizer without using a stabilizer charging pump, such as indicated at 35.

While the color removing solvent operation is a desirable feature of the process, it is not essential to the rest of the operation. This reactivating treatment is a desirable adjunct and may or may not be used with the contact filtration in propane solution, as circumstances make advisable.

The process is continuous in the sense that no temperature and reaction periods are required as in processes heretofore proposed. There are therefore practically no losses in time or materials and superior results are attained economically.

What is claimed is:

1. The herein disclosed process of treating lubricating oil, which comprises dissolving lubricating oil in a liquefied normally gaseous hydrocarbon solvent under pressure sufficient to maintain the solvent in the liquid state, heating and contacting the solution with adsorbent clay at a temperature in excess of 125° F. under pressure sufficient to maintain the heated solvent in the liquid state, separating the solution from the clay under pressure sufficient to maintain the treated oil in the liquid state and separating the treated oil from the solvent.

2. The process of claim 1, in which the solvent is liquefied propane.

3. The process of claim 1, in which the contacting is effected at a temperature within the range of 125° F. to 175° F.

4. The process of claim 1, with the added steps of washing retained oil from the adsorbent clay with fresh solvent under pressure sufficient to maintain the solvent in the liquid state, heating the clay to distill retained solvent from it under superatmospheric pressure, reducing the pressure on the heated clay to vaporize remaining traces of solvent from the clay and returning the solvent in liquefied state into mixture with fresh lubricating oil being treated as described.

5. The process of decolorizing lubricating oil, which comprises dissolving lubricating oil in liquefied normally gaseous hydrocarbon solvent under pressure sufficient to maintain the solvent in the liquid state, mixing fine contact clay with the solution under such pressure, heating the solution to a temperature in excess of 125° F. under pressure sufficient to maintain the solvent in the liquid state, filtering the contact clay from the solution under pressure sufficient to maintain the solvent in the liquid state and separating the solvent from the treated oil.

6. The process of claim 5, in which the heated solution is cooled before filtering.

7. The method of continuously decolorizing viscous lubricating oil by contacting, which comprises mixing the oil to be decolorized with a comminuted absorbent decolorizing clay and then continuously mixing said mixture under pressure with a normally gaseous liquefied hydrocarbon solvent to effect extreme dilution of the oil in the solvent, passing the mixture of oil, decolorizing clay and solvent continuously through a heating zone at a temperature of 125° F. to 175° F. to effect complete solution of the oil and contact decolorization in transit under pressure sufficient to hold the solvent in the liquid state and thence in continuous flow through a cooling zone to remove added heat and then filtering the cooled mixture under pressure.

8. The method of continuously decolorizing viscous lubricating oil by contacting, which comprises mixing the oil to be decolorized with a comminuted adsorbent decolorizing clay and then continuously mixing said mixture under pressure with a normally gaseous liquefied hydrocarbon solvent to effect extreme dilution of the oil in the solvent, passing the mixture of oil, decolorizing clay and solvent continuously through a heating zone at a temperature of 125° F. to 175° F. to effect complete solution of the oil and contact decolorization in transit under pressure sufficient to hold the solvent in the liquid state and thence in continuous flow through a cooling zone to remove added heat and then filtering the cooled mixture under pressure, relieving pressure on the filter to vaporize the solvent from the adsorbent decolorizing clay, liquefying the solvent and recycling it for decolorizing additional lubricating oil.

CLAUDE F. TEARS.